US008284237B2

(12) United States Patent
Chen et al.

(10) Patent No.: US 8,284,237 B2
(45) Date of Patent: Oct. 9, 2012

(54) RENDERING MULTIVIEW CONTENT IN A 3D VIDEO SYSTEM

(75) Inventors: Ying Chen, San Diego, CA (US); Miska Matias Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 587 days.

(21) Appl. No.: 12/556,298

(22) Filed: Sep. 9, 2009

(65) Prior Publication Data

US 2011/0058021 A1 Mar. 10, 2011

(51) Int. Cl.
*H04N 15/00* (2006.01)
*H04N 13/00* (2006.01)

(52) U.S. Cl. ............... 348/43; 348/46; 348/51
(58) Field of Classification Search .................... 348/43, 348/46, 51
See application file for complete search history.

(56) References Cited

U.S. PATENT DOCUMENTS

| 2001/0052935 | A1 | 12/2001 | Yano | |
| 2007/0279494 | A1* | 12/2007 | Aman et al. | 348/169 |
| 2009/0185759 | A1 | 7/2009 | Liu et al. | |
| 2011/0058021 | A1* | 3/2011 | Chen et al. | 348/46 |
| 2011/0096832 | A1* | 4/2011 | Zhang et al. | 375/240.08 |

FOREIGN PATENT DOCUMENTS

| EP | 2230855 A2 | 9/2010 |
| WO | 2009091563 A1 | 7/2009 |

OTHER PUBLICATIONS

Joint Draft 5.0 on Multiview Video Coding, 25th JVT meeting, Shenzhen, China, Oct. 2007, http://ftp3.itu.ch/av-arch/jvt-site/2007_10_Shenzhen/JVT-Y209.zip.
A. Smolic, H. Kimata, and A. Vetro "Development of MPEG Standards for 3D and Free Viewpoint Video," SPIE's International Symposium on Optics East 2005, (Oct. 2005).
S. Shimizu, H. Kimata, "New View Synthesis Prediction Framework using Residual Prediction", JVT-W087, San Jose, USA, Apl. 2007.
H.-Y. Shum, S.B. He, and S.-C. Chan, "Survey of image-based representations and compression techniques," IEEE Trans. CSVT, vol. 13, No. 11, pp. 1020-1037, 2003.
E. H. Adelson and J. Bergen, "The plenoptic function and the elements of early vision," in Computational Models of Visual Processing. Cambridge, MA: MIT Press, 1991, pp. 3-20.
"Joint Draft 6.0 on Multiview Video Coding," JVT-Z209, Antalya, Turkey, Jan. 2008.
Y. Chen, P. Hao and J. Yu, "Shear-Resize Factorizations for Fast Multi-Modal Volume Registration," IEEE International Conference on Image Processing (ICIP), Oct. 2004.
G. Wolberg, "Digital Image Warping," IEEE Computer Society Press, Los Alamitos, CA, USA, 1990.
L. McMillan and U. Bishop, "Plenoptic modeling: An image-based rendering system," in Proc. ACM Annu. Computer Graphics Conf., Aug. 1995, pp. 39-46.
S. E. Chen, "QuickTime VR-an image-based approach to virtual environment navigation," in Proc. ACM Annu. Computer Graphics Conf., Aug. 1995, pp. 29-38.

(Continued)

*Primary Examiner* — Michael Won
(74) *Attorney, Agent, or Firm* — Nokia Corporation

(57) ABSTRACT

There is disclosed methods and apparatuses for multi-view video encoding, decoding and display. A depth map is provided for each of the available views. The depth maps of the available views are used to synthesize a target view for rendering an image from the perspective of the target view based on images of the available views.

23 Claims, 4 Drawing Sheets

OTHER PUBLICATIONS

M. Levoy and P. Hanrahan, "Light field rendering," in Proc. ACM Annu. Computer Graphics Conf., New Orleans, LA, Aug. 1996, pp. 31-42.

S. J. Gortler, R. Grzeszczuk, R. Szeliski, and M. F. Cohen, "The lumigraph," in Proc. ACM Annu. Computer Graphics Conf., New Orleans, LA, Aug. 1996, pp. 43-54.

J.-X. Chai, X. Tong, S.-C. Chany, H.-Y. Shum, "Plenoptic sampling," in Proc. SIGGRAPH 2000, pp. 307-318.

L. Westover. "Footprint evaluation for volume rendering," Computer Graphics (Proceedings of SIGGRAPH 90), 24 (4):367-376, Aug. 1990.

Z. Lin and H.-Y. Shum, "A Geometric Analysis of Light Field Rendering," International J. of Computer Vision, vol. 58, No. 2, pp. 121-138, Jul. 2004.

A. Kubota, A Smolic, M. Magnor, M. Tanimoto, T. Chen, C. Zhang, "Multiview Imaging and 3DTV," IEEE Signal Processing Magazine vol. 24, Issue 6, Nov. 2007.

M. Regan and R. Pose, "An interactive graphics display architecture," In Proceedings of IEEE Virtual Reality Annual International Symposium, pp. 293-299, Seattle, Washington, Sep. 1993.

M. Regan and R. Pose, "Priority rendering with a virtual reality address recalculation pipeline," In Computer Graphics Annual Conference Series (Proceedings of SIGGRAPH 94), pp. 155-162, Orlando, Florida, Jul. 1994.

G. R. Hofmann, "The calculus of the non-exact perspective projection," In Proceedings of the European Computer Graphics Conference and Exhibition (Eurographics '88), pp. 429-442, Nice, France, Sep. 1988.

G. Schaufler, "Nailboards: A rendering primitive for image caching in dynamic scenes," In Julie Dorsey and Philipp Slusallek, editors, Rendering Techniques '97: Proceedings of the Eurographics Rendering Workshop 1997, pp. 151-162, St. Etienne, France, Jun. 1997.

S. Chen and L. Williams, "View interpolation for image synthesis," in Proc. ACM Annu. Computer Graphics Conf., Aug. 1993, pp. 279-288.

T. Werner, R. D. Hersch, and V. Hlavac, "Rendering real-world objects using view interpolation," In Fifth International Conference on Computer Vision (ICCV'95) (Cambridge, Massachusetts, Jun. 1995), pp. 957-962.

L. McMillan and G. Bishop, "Head-tracked stereoscopic display using image warping," In S. Fisher, J. Merritt, and B. Bolas, editors, Proceedings SPIE, vol. 2409, pp. 21-30, San Jose, CA, Feb. 1995.

W. R. Mark, L. McMillan, and G. Bishop, "Post-rendering 3D warping," In Proceedings of the 1997 Symposium on Interactive 3D Graphics, pp. 7-16, Providence, RI, Apr. 1997.

C. Tomasi and R. Manduchi, "Bilateral filtering for gray and color images", Proc. ICCV'98, pp. 839, 1998.

L. McMillan, "An Image-Based Approach to Three-Dimensional Computer Graphics. PhD thesis," University of North Carolina at Chapel Hill, Chapel Hill, NC, USA, 1997.

J. Shade, S. Gortler, L.-W. He, and R. Szeliski, "Layered depth images," in Proc. ACM Annu. Computer Graphics Conf., Orlando, FL, Jul. 1998, pp. 231-242.

W. R. Mark, "Post-Rendering 3D Image Warping: Visibility, Reconstruction, and Performance for Depth-Image Warping. PhD thesis," University of North Carolina at Chapel Hill, Chapel Hill, NC, USA, Apr. 1999.

A. Kubota, K. Aizawa, T. Chen, "Virtual View Synthesis through Linear Processing without Geometry," ICIP 2004.

International Search Report and Written Opinion, received in corresponding Patent Cooperation Treaty Application No. PCT/IB2010/054055. Dated Dec. 22, 2010. 13 pages.

Bayakovski, Y. "Depth Imaged-Based Representations for Static and Animated 3D Objects". International Conference on Image Processing (ICIP), Sep. 22, 2002, ISBN 978-0-7803-7622-9, whole document.

Fehn, Christoph. "Depth-Imaged-Based Rendering (DIBR), Compression and Transmission for a New Approach on 3D-TV". Proceedings of the International Society for Optical Engineering (SPIE), SPIE, USA, May 31, 2004, whole document.

* cited by examiner

RENDERING MULTIVIEW CONTENT IN A 3D VIDEO SYSTEM

FIELD OF THE INVENTION

The present invention relates to three dimensional (3D) video systems, and more particularly to rendering of multiview content in a 3D video system.

BACKGROUND OF THE INVENTION

Three dimensional (3D) video has gained significant interest recently. Along with the advances in capture and display technologies, 3D video is becoming a reality in consumer domain with different application opportunities. 3D video applications can be grouped under three categories, free-viewpoint video, 3D TV (video), and immersive teleconferencing. The requirements of these applications are quite different and each category has its own challenges.

One technology fostering the feasibility of various envisioned 3D video applications is the multi-view video coding (MVC) techniques. In multi-view video coding, video sequences output from different cameras, each corresponding to a different view, are encoded into one bit-stream. At the client side, a particular view can be reconstructed and displayed by decoding the pictures belonging to that view. It is also possible that more than one view is reconstructed and displayed.

When transmitting 3D content based on 2D images, the bandwidth constrain is an important issue, thus a powerful compressor is required to code the 3D content with only reasonable number of views. However, at the client, the user may wish to view the 3D content at any angle. Therefore, it is desirable that the decoder is able to render views as much as possible and as continuous as possible. View synthesis can be used to solve the problem by transmitting reasonable number of views while interpolating other views at the renderer.

However, the prior art view synthesis arrangements have some technical shortcomings, especially relating to warped depth images. For example, there has not been presented an efficient method, suitable for 3D video applications, for tackling point-like artifacts, such as occlusion artifacts and pinholes, in the images, or visibility problems when multiple pixels from reference images are warped into the same pixel of a destination image.

SUMMARY OF THE INVENTION

Now there has been invented an improved method and technical equipment implementing the method, by which the above problems are alleviated. Various aspects of the invention include a method, an apparatus, a decoder, a chipset and a computer readable medium comprising a computer program stored therein, which are characterized by what is stated in the independent claims. Various embodiments of the invention are disclosed in the dependent claims.

According to a first aspect, a method according to the invention is based on the idea of receiving at least one reference image having a corresponding depth image; synthesizing a set of pixels, each associated with a warped depth value, based on the at least one reference image and the corresponding depth image; segmenting the warped depth values of the set of pixels into a plurality of depth ranges; and transforming the at least one reference image into a synthesized image based on at least one depth range.

According to an embodiment, the method further comprises creating a histogram on the basis of the warped depth values of the set of pixels; and performing said segmenting on the basis of the histogram.

According to an embodiment, the method further comprises determining a depth range for visible pixels for a pixel position of the synthesized picture; selecting candidate pixels from the set of pixels within said depth range for visible pixels; and determining one or more candidate pixels which are visible at said pixel position of the synthesized picture.

According to an embodiment, the method further comprises selecting the depth range such that the depth range is the minimum of all the depth ranges that cover the candidate pixels.

According to an embodiment, in response to having more than one candidate pixel, reconstructing at least one reconstructed pixel on the basis of the depth values of the visible candidate pixels.

According to an embodiment, the method further comprises determining a pinhole pixel position in the synthesized image; and determining a pixel value of the pinhole pixel position based on a selected depth range.

According to an embodiment, the method further comprises a second set of selecting candidate pixels from the set of pixels within the selected depth range that are in the proximity of the pinhole pixel position; and deriving a pinhole pixel value from the candidate pixels.

According to an embodiment, the depth range is selected in a way that the depth range is the minimum of all the ranges that cover the second set of candidate pixels.

According to an embodiment, the depth range is selected in a way that the depth range is covers a maximum number of candidate pixels among the second set of candidate pixels.

The arrangement according to the invention provides significant advantages. The depth histogram clustering and the division into depth ranges facilitates and fastens the determination of candidate pixels in transformed depth images having pixel visibility problems relating to their depth determination or hole-filling. Furthermore, only the candidate pixel(s) requiring depth-related processing may be chosen for processing, thus leaving the unrelated pixel unaffected. Moreover, the reconstruction method according to an embodiment allows also the depth values of more than one pixel to be taken into account.

Further aspects of the invention include an apparatus, a decoder, a computer readable medium comprising a computer program stored therein, and a chipset, which all are preferably configured to carry out the method steps described above.

These and other aspects of the invention and the embodiments related thereto will become apparent in view of the detailed disclosure of the embodiments further below.

BRIEF DESCRIPTION OF THE DRAWINGS

In the following, various embodiments of the invention will be described in more detail with reference to the appended drawings, in which.

DESCRIPTION OF EMBODIMENTS

In the following, the invention will be illustrated by referring to view synthesis in a 3D video system based on multi-view video coding. It is, however, noted that the invention is not limited to multi-view video coding solely, but it can be implemented in any video/image applications.

Video coding standards include ITU-T H.261, ISO/IEC MPEG-1 Video, ITU-T H.262 or ISO/IEC MPEG-2 Video, ITU-T H.263, ISO/IEC MPEG-4 Visual and ITU-T H.264 (also know as ISO/IEC MPEG-4 AVC), including its scalable video coding (SVC) extension. In addition, there are currently efforts underway with regards to the development of new video coding standards. One such standard under development is the multi-view video coding (MVC) standard, which will become another extension to H.264/AVC.

In multi-view video coding, video sequences output from different cameras, each corresponding to a different view, are encoded into one bit-stream. After decoding, to display a certain view, the decoded pictures which belong to that view are reconstructed and displayed. It is also possible that more than one view is reconstructed and displayed.

Multi-view video coding has a wide variety of applications, including free-viewpoint video/television, 3D TV and surveillance. Currently, the Joint Video Team (JVT) of ISO/IEC Motion Picture Expert Group (MPEG) and ITU-T Video Coding Expert Group is working to develop a MVC standard, which will become an extension of H.264/AVC. These two (draft) standards are referred herein as MVC and AVC, respectively. For a more detailed description of the implementation of MVC, reference is made to the latest working draft of MVC; i.e. JVT-Y209, "Joint Draft 5.0 on Multiview Video Coding," 25th JVT meeting, Shenzhen, China, October 2007, available from http://ftp3.itu.ch/av-arch/jvt-site/2007_10_Shenzhen/JVT-Y209.zip.

Figure 1:
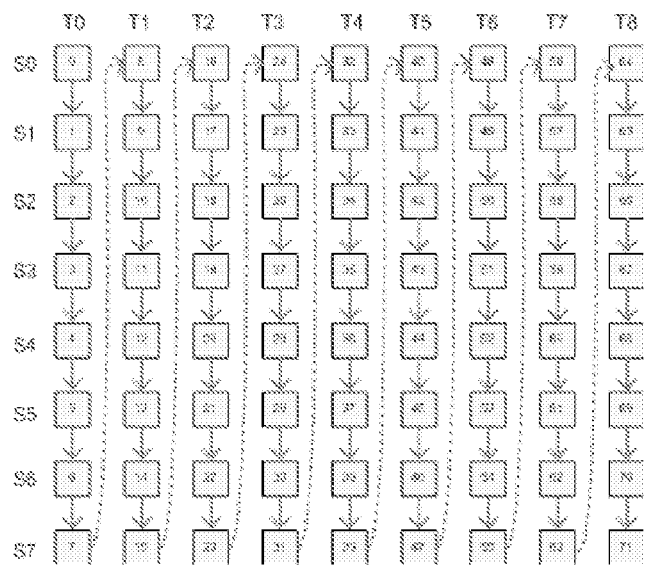
FIG. 1 shows a typical MVC decoding order, i.e. time-first coding.

FIG. 1 shows a typical MVC decoding order (i.e. bitstream order), which is referred as time-first coding. Each access unit is defined to contain the coded pictures of all the views (S0-S7) for one output time instance (T0-T8). It should be noted that the decoding order of access units may not be identical to the output or display order.

Figure 2:
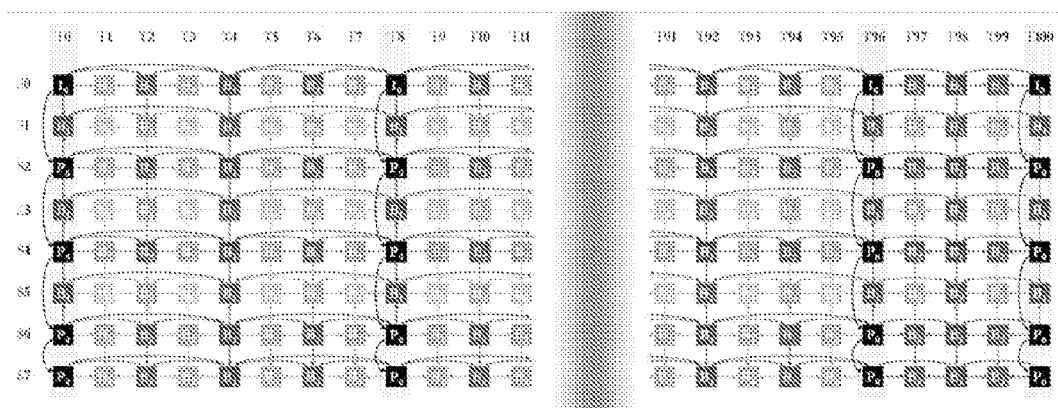
FIG. 2 shows a typical MVC prediction structure for multi-view video coding.

A typical MVC prediction (including both inter-picture prediction within each view and inter-view prediction) structure for multi-view video coding is shown in FIG. 2, where predictions are indicated by arrows, the pointed-to object using the point-from object for prediction reference. The inter-view prediction is supported by texture prediction. In the inter-view prediction, reconstructed pictures having the same output time instance as the current picture are used as reference pictures for the current picture. Those pictures used as reference by pictures in other views are referred as inter-view reference pictures. The inter-view prediction relationship, also referred to as view dependency, is signaled in the sequence parameter set MVC extension.

Figure 3:
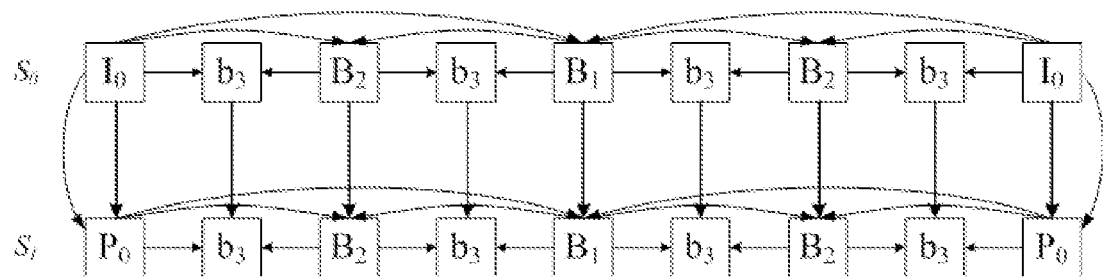
FIG. 3 shows a typical prediction structure of stereoscopic video.

FIG. 3 illustrates a typical prediction structure of stereoscopic video, wherein pictures in each view (S0, S1) form a hierarchical B temporal prediction structure. Each picture is associated with a temporal level. The base view (view 0, denoted as S0) is independently coded and the other view (view 1, denoted as S1) is dependent on view 0.

Three dimensional (3D) video has gained significant interest recently. Furthermore, with the advances in acquisition and display technologies, 3D video is becoming a reality in consumer domain with different application opportunities. Given a certain maturity of capture and display technologies and with the help of MVC techniques, a number of different envisioned 3D video applications are getting feasible.

When transmitting 3D content based on 2D images, the bandwidth constrain is an important issue, thus a powerful compressor is required to code the 3D content with only reasonable number of views. However, at the client, the user may require the experience of viewing the 3D content at any angle, in a manner of view navigation or auto-stereoscopic video. So it is desirable for the decoder to render views as much as possible and as continuous as possible. View synthesis can be used to solve the problem by transmitting reasonable number of views while interpolating other views at the renderer.

View synthesis belongs to image-based rendering (IBR) family. IBR is a powerful alternative to traditional geometry-based rendering. It generates virtual (novel) views from 2D images without capturing, storing, transmission or even construction of a 3D geometry model.

The various IBR techniques have been traditionally classified according to their geometry-dependency into 3 categories: 1) rendering with no geometry; 2) rendering with implicit geometry; and 3) rendering with explicit geometry. On the other hand, the IBR techniques may also be classified according to the density of the sampled view into 2 categories: 1) IBR techniques wherein a novel view is rendered from densely sampled views; 2) IBR techniques wherein a novel view is rendered from sparsely sampled views.

The IBR techniques wherein a novel view is rendered from densely sampled views are typically based on the so-called plenoptic function or its subsets. The plenoptic function was originally proposed as a 7D function to define the intensity of light rays passing through the camera center at every 3D location (3 parameters), at every possible viewing angle (2 parameters), for every wavelength, and at every time. If the time and the wavelength are known, the function simplifies into 5D function. The so-called light field system and Lumigraph system, in turn, represent objects in an outside-looking-in manner using a 4D subset of the plenoptic function.

However, all these IBR techniques based on the plenoptic function encounter a problem related to sampling theory. Based on sampling theory, minimum camera spacing density enabling to sample the plenoptic function densely enough to reconstruct the continuous function can be defined. Nevertheless, even the functions have been simplified in accordance with the minimum camera spacing density, enormous amount of data are still required for storage. Theoretical approach may result in a camera array system with more than 100 cameras, which is impossible for most practical applications, due to limitation of camera size and storage capacity. That is the main reason why this IBR category is not feasible for 3D video.

In contrast to the IBR techniques more or less based on the plenoptic function, IBR techniques related to image warping may be used to render a novel view from sparsely sampled views.

The 3D image warping techniques conceptually construct temporally a 3D point (named unprojection) and reproject it to a 2D image belonging to the new image plane. The concatenation of the unprojection and then reprojection is the essential idea in 3D image warping.

The whole system may have a number of views, while when interpolating a novel view, only several closest views are used. Normally, the number of views for synthesizing a novel view is 1, 2 or 4. Note that although the view synthesis process requires relatively less neighbouring views, it does not necessarily mean that in the systems belonging to this category require only a few views being captured.

In 3D image warping, a perspective warp is first used for small rotations in a scene. The perspective warp compensates rotation but is not sufficient to compensate translation, therefore depth of objects in the scene is considered. One approach is to divide a scene into multiple layers and each layer is independently rendered and warped. Then those warped layers are composed to form the image for the novel view. Independent image layers are composed in front-to-back manner. This approach has the disadvantage that occlusion cycles may exist among three or more layers, which challenges the whole system. An alternative solution is to resolve the composition with Z-buffering. It does not require the different layers to be non-overlapping.

The above methods apply warping techniques to the entire scene, or entire layer of the scene (sprite). A different type of system utilizes IBR for only certain parts (or pixels) of the scene. For example, S. E. Chen, "QuickTime VR-an image-based approach to virtual environment navigation," in Proc. ACM Annu. Computer Graphics Conf., August 1995, pp. 29-38, introduces a method, wherein the QuickTime VR panoramic viewer enables discrete changes in viewpoint along with arbitrary rotation and virtual camera zooming. This system stores sparsely sampled reference images as cylindrical manifolds. As for translation, only the pre-defined points can be accessed.

Other warping techniques employ explicit or implicit depth information (per-pixel), which thus can overcome certain restrictions, e.g., relating to translation. One can use e.g. pre-computed 3D warps, referred to as morph maps, which hold the per-pixel, image-space disparity motion vectors for a 3D warp of the associated reference image to the fiducial viewpoint. When generating a novel view, offset vectors in the direction specified by its morph-map entry is utilized to interpolate the depth value of the new pixel. If the reference image viewpoint and the fiducial viewpoint are close to each other, the linear approximation is good.

When pixels are mapped to the same pixel in the destination/target image, Z-buffering concept is adopted to resolve the visibility. The offset vectors, which can also be referred to as disparity, are closely related to epipolar geometry, wherein the epipole of a second image is the projection of the center (viewpoint) of planar the second image to a first image.

Although in theory the sparsely sampled view synthesis approaches are worse than the densely sampled view synthesis in terms of the quality of the generated views, they have the following advantages:

the total number of the views that need to be captured and stored is smaller, it therefore saves transmission bandwidth in a 3D video system; and the fact that less views are referenced for view interpolation results in less complexity in the renderer and thus is more suitable for 3D video systems.

Utilization of depth images is an actively researched topic, potentially giving a substantial compression efficiency improvement compared to MVC. Depth can be utilized to synthesize novel views from available ones, thus enabling use cases where only a limited number of input views are available for coding and transmission. Subsequently, using the input video streams plus the depth information, any number of intermediate views can be derived and generated for rendering on 3D displays or for enabling free view point applications where the user can select to view the 3D scene from an arbitrary view point. A synthesized view can be also be used as a prediction reference similarly to inter and inter-view prediction references, therefore making view synthesis as a part of the decoding loop.

However, the implementation of view synthesis faces with certain problems, which actually are quite closely related to each other. The problems relate to visibility, hole-filling and reconstruction.

Visibility problem usually refers to the situation when multiple pixels from reference images are warped into the same pixel of a destination image.

The traditional solution is based on the Z-buffering concept, that is, the warped pixel corresponding to the smallest depth is used to overwrite the other pixels. An alternative solution, called occlusion-compatible mapping, is aims to solve the problem by computing visibility without depth. For the computing, only the centers of the projections of the desired and reference images, as well as the pinhole-camera model for the reference image are needed.

Still, there remain two problems.

A pixel in the reference image(s) is usually not warped exactly in the integer samples of the target image of the novel view. In this case, the warped depth of a pixel may not exactly stand for the depth of the nearest integer pixel. Accordingly, Z-buffering or alternative pixel overwriting method may be less efficient in terms of generating the optimal depth in the warped image.

When two pixels are with almost the same depth, or very close depth values, both of their color samples should preferably contribute to the final pixel in the warped image. Overwriting method, e.g., Z-buffering, however, allows only one pixel to be calculated.

Occlusion artifacts, appearing as "holes" in the image, are noticeable in IBR system when a single reference image is utilized. Good hole-filling algorithm therefore is important to guarantee the quality of the warped image.

One straightforward solution is to use multiple reference images from different directions of the desired images. This solution is feasible in most cases, especially when the translation or rotation angle is relatively small. There are methods, e.g., layered depth-images, to store more than one pair of color-depth images. An additional layer hidden in the original image may be used to fill-in the holes when occlusion happens.

Except for the occlusion, pinholes are also noticeable especially at the edges or some detailed regions. To compensate for the pinholes, the method may need to smooth the warped depth images, which in turn causes a further problem:

Smoothing the depth images eliminate the sharpness of the depth images in the pixels that are not corresponding to pinholes.

As regard to the reconstruction process, the reconstruction of a desired image typically consists of two steps: transforming samples in reference images into the destination image space, with depth; and then merging and compositing candidate pixels into the final pixel of a destination image.

The reconstruction at the edges of the objects is difficult. There are methods that depend on segmentation at the reference images. In areas that are supposed to be in the interior regions, compositing or interpolating methods can be applied. Except linear interpolations, a splat-like method is also known with the splat and footprint commutated based on the shape of the edge, which forms one pixel based on the contribution of the nearby pixels. The contributions of the nearby pixels are calculated based on the footprint which is dependent on a kernel function.

There still remain two problems relating to the reconstruction.

If segmentation methods are used, they are usually very time consuming.

Interpolation or splatting methods are applied in 2D images, which ignore the influence of depth.

To alleviate all of the above problems, there has now been invented a new depth histogram clustering method, which is firstly applied to classify the original depth into different depth intervals. Then, solving of the visibility, pinhole filling and reconstruction problems is improved based on the classified depth information. In accordance with an embodiment, the visibility problem is alleviated by considering only a small subset of pixels that have the depth levels within the minimum depth interval. In accordance with another embodiment, when a pinhole is filled, only pixels in one depth interval are considered. In accordance with a further embodiment relating to the reconstruction, the 3D interpolation/splatting takes only pixel values within the same depth interval into consideration.

In order to discuss the embodiments on a general basis, notations and coordinate conventions which are typically used as a basis for 3D warping are firstly discussed. In particular, exact definitions of the notations used in 3D warp equations for conventions between camera coordinate and world-space coordinate are discussed in the following.

Figure 4:
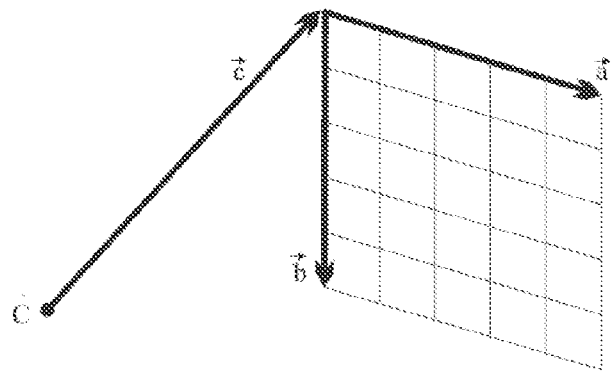
FIG. 4 shows a camera model for planar projections.

The projection from world-space coordinate to the camera coordinate is called planar projections, as shown in FIG. 4. Assume $\vec{a}, \vec{b}, \vec{c}$ form the basis vectors for the camera coordinate system. It should be noted the system may also be non-orthogonal and not normalized. For any point (r,s,t) in this camera coordinate system, its world-space coordinate $$\vec{x} = r\vec{a} + s\vec{b} + t\vec{c} + \dot{C} \qquad (1)$$

wherein $\dot{C}$ is the center of this projection. Let matrix $P=[\vec{a}\ \vec{b}\ \vec{c}]$ be the projection matrix from the camera coordinate to the world-space coordinate. Let $\vec{u}=[u\ v\ 1]^T=[r/t\ s/t\ 1]^T$.

$$S = \frac{\vec{a} \times \vec{b}}{\|\vec{a} \times \vec{b}\|} \cdot \vec{c}$$

is the distance from the center of projection to the image plane, since $(\vec{a} \times \vec{b}) \cdot \vec{c}$ is the volume of the rhombohedron generated by these three basis vectors and $\|\vec{a} \times \vec{b}\|$ is the size of parallelogram generated by $\vec{a}$ and $\vec{b}$. In computer graphics, the depth value is the projection of the vector (from the center of the projection to the 3D point, $\vec{p}$ is vector from $\dot{C}$ to $\vec{x}$) to the normal vector of the image plane (, which is the same direction as $\vec{a} \times \vec{b}$): $z=\vec{p} \cdot \vec{n}$.

Thus, we have t:1=z:S. Thereby, the equation (1) turns to $$\vec{x} = P\vec{tu} + \dot{C} = P\frac{z}{S}\vec{u} + \dot{C} \qquad (2)$$

Given two set of camera systems, with different depth, basis vectors and centers of projection, we have:

$$P_1 \frac{z_1}{S_1}\vec{u}_1 + \dot{C}_1 = P_2 \frac{z_2}{S_2}\vec{u}_2 + \dot{C}_2 \qquad (3)$$

assuming we are warping from view 1 to view 2, which respectively correspond to camera parameter set 1 and camera parameter set 2. Then given a pixel in the $[u_1\ v_1]^T$ of the image in view 1, the corresponding (warped-to) coordination in the image in view 2 is: $[u_2\ v_2]^T$, which is a part of vector $\vec{u}_2$, and can be calculated as follows:

$$\frac{z_2}{S_2}\vec{u}_2 = P_2^{-1}P_1\frac{z_1}{S_1}\vec{u}_1 + P_2^{-1}(\dot{C}_1 - \dot{C}_2) \qquad (4)$$

In 3D warping, after all pixels in the reference images are transformed, each pixel has its new depth value and the coordinates in the destination image plane. All warped depth values have a probability distribution, which can be digitized as a depth histogram. The depth histogram clustering is applied and the depth values are divided into several intervals, described as $I_i=[d_i-w_i/2, d_i+w_i/2]$, wherein i=1 ... N, is the number of depth regions. Those regions are ordered in a way that $d_i<d_j$ if i<j. Note that normally $I_i \cap I_j = \phi$, if i≠j and $$\bigcup_i I_i$$

represents the range or an the possible depth values. Here $d_i$ is referred to as the center value of the interval $I_i$ and $w_i$ as the window of the interval.

Figure 5:
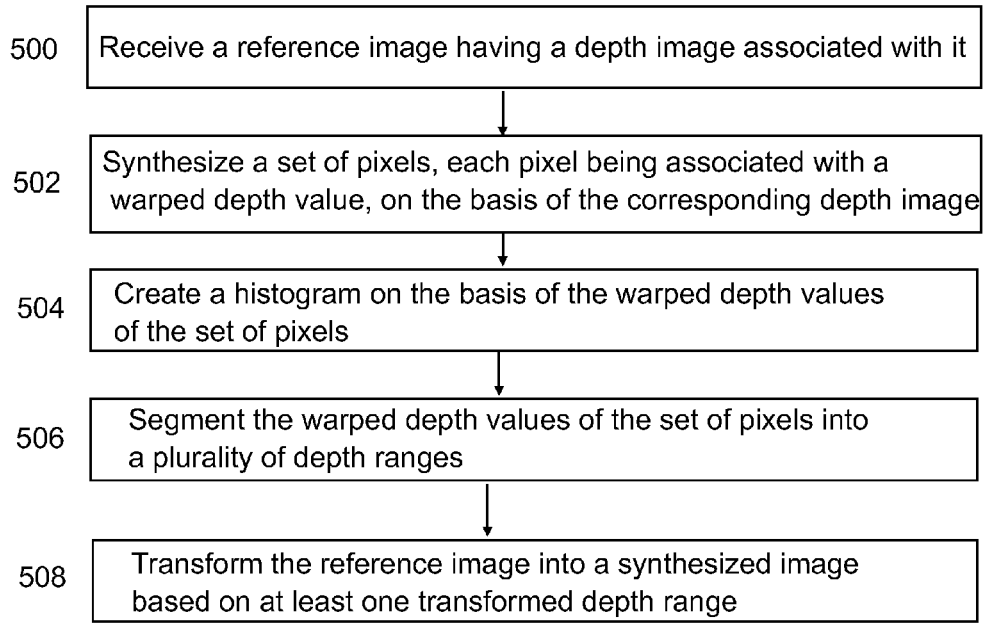
FIG. 5 shows a flow chart illustrating a preferred embodiment of the invention.

Thus, an aspect of the invention includes a method for synthesizing a synthesized picture based on at least one reference image, which is further illustrated in the flow chart of FIG. 5. The procedure is preferably carried out in an apparatus, such as a mobile terminal or a portable computer, which comprises a view synthesizer unit for performing the image synthesis. Firstly, the view synthesizer unit receives (500) a reference image, which has a depth image associated with it. Then, from the reference image a set of pixels, is synthesized (502), e.g. warped and associated with a warped depth values. According to a preferred embodiment, a histogram could be created (504) on the basis of the warped depth values. In any case, the warped depth values of the set of pixels are then segmented (506) into a plurality of depth ranges; if the histogram has been created, then the segmenting can preferably be carried out on the basis of the histogram. Finally, the reference image is transformed (508) into a synthesized image based on at least one transformed depth range.

According to an embodiment, the depth determination for visibility is carried out based on the knowledge that for each integer pixel in the destination image plane, there are typically a set of warped pixels with a certain window of the integer pixel. It should be noted that the window size and shape are not the essential for the determination.

A warped pixel can be denoted as $[x\ y\ z]^T$. For example, a square window with size T can be considered. Given an integer pixel $[u\ v]^T$ in the destination image plane, its 2D window in the image plane is: $D=\{(x, y)|u-T/2 \leq x<u+T/2, v-T/2 \leq y<v+T/2\}$. The value T can be relatively smaller (<1) when more than one reference images are used.

Given the pixels and the associated depth values, denoted as $Z'=\{z'_1, z'_2 \ldots z'_K\}$. Those K candidates' warped depths belong to 1 to K depth intervals. Let $I_t$ be the interval among them that has the smallest center value. Then a part of those depth values among $z'_1, z'_2 \ldots z'_K$ are within this interval, which can be denoted as $Z''=\{z''_1, z''_2 \ldots z''_C | z''_j \in I_t \cap Z', j=1 \ldots C\}$, wherein C is the number of the elements in Z'', which $I_t$ is also the number of final candidates; i.e. a set of candidate pixels, which are in the region $I_t$ and were originally in Z'.

Thus, according to this embodiment, instead of considering the pixels with depth values in Z' for the visibility problem, only the pixels in the set of candidate pixels Z'' are considered. This embodiment is further illustrated in the flow chart of FIG. 6, which can be regarded as a particular implementation of the final step (508) of FIG. 5, and wherein the starting point is thus the outcome of the step 506. As a first step, it is determined (600) whether there is a potential visibility problem, i.e. at least one pixel from reference image(s) is warped into the same pixel position of the destination image, or a pinhole problem, i.e. no pixels from reference image(s) are warped into a certain pixel of the destination image. If a potential visibility problem is noticed, the procedure is continued from the step 602; in case of a pinhole problem, the procedure is depicted in FIG. 7 described more in detail further below.

Thus, for the synthesized image a depth range for visible pixels is determined (602) for a certain pixel position of the synthesized picture. Thereafter, from the set of pixels candidate pixels are selected (604) within the depth range for visible pixels, and then it is determined (606) which one or more candidate pixels are visible at said pixel position of the synthesized picture. If it is noticed (608) that there is only one visible candidate pixel, then it is naturally selected (610) to represent the visible pixel. However, if there is more than one candidate pixel being visible at said pixel position of the synthesized picture, then according to an embodiment, the at least one candidate pixel is reconstructed (612) on the basis of the depth values of the visible candidate pixels, e.g. by averaging the values.

According to a further embodiment, the depth range is selected in a way that this range is the minimum of all the depth ranges that cover the candidate pixels. It should be noticed that herein minimum refers to the depth values, which are closest to the camera. If for some reason an opposite coordinate system is used, wherein the maximum values represent the depth values closest to the camera, then the selected depth range should be the maximum of all the depth ranges that cover the candidate pixels.

Considering the problem of pinhole filling in the depth image, a pinhole corresponds to an integer pixel position in the destination image plane, which integer pixel position has no visible warped pixels. According to an embodiment, in order to find candidate pixels for the pinholes, i.e. those integer pixel position having no visible warped pixels, the shape or the size of the window is changed till appropriate candidate pixels are found. However, how to change the window is not an essential part of this process.

Let us assume that after certain procedure, the following candidates warped from the reference images are considered as candidate pixels, with depth values denoted as $Z'=\{z'_1, z'_2 \ldots z'_K\}$, wherein the K depth values may belong to 1 to K depth intervals. Then, according to an embodiment, the most suitable interval is selected among the depth intervals that the interval having the smallest center value is selected. Alternatively, according to an embodiment, the most suitable interval is selected among the depth intervals that the interval having the most candidates is selected.

After the appropriate interval $I_t$ is selected, only those pixels in this interval $I_t$ (denoted as $Z''=\{z''_1, z''_2 \ldots z''_C | z''_j \in I_t \cap Z', j=1 \ldots C\}$) are considered as candidate for pinhole filling. Note that in this embodiment, the set of candidate pixels Z'' is typically different than the set of candidate pixels in the embodiment solving the visibility problem; therefore Z'' is referred herein as a second set of candidate pixels. Note also that both pinhole filling and visibility problem, after processing and candidates narrowing down, may only have 1 pixel left. When more pixels are left, reconstruction problems are to be considered and the embodiments described further below may be applied.

Figure 6:
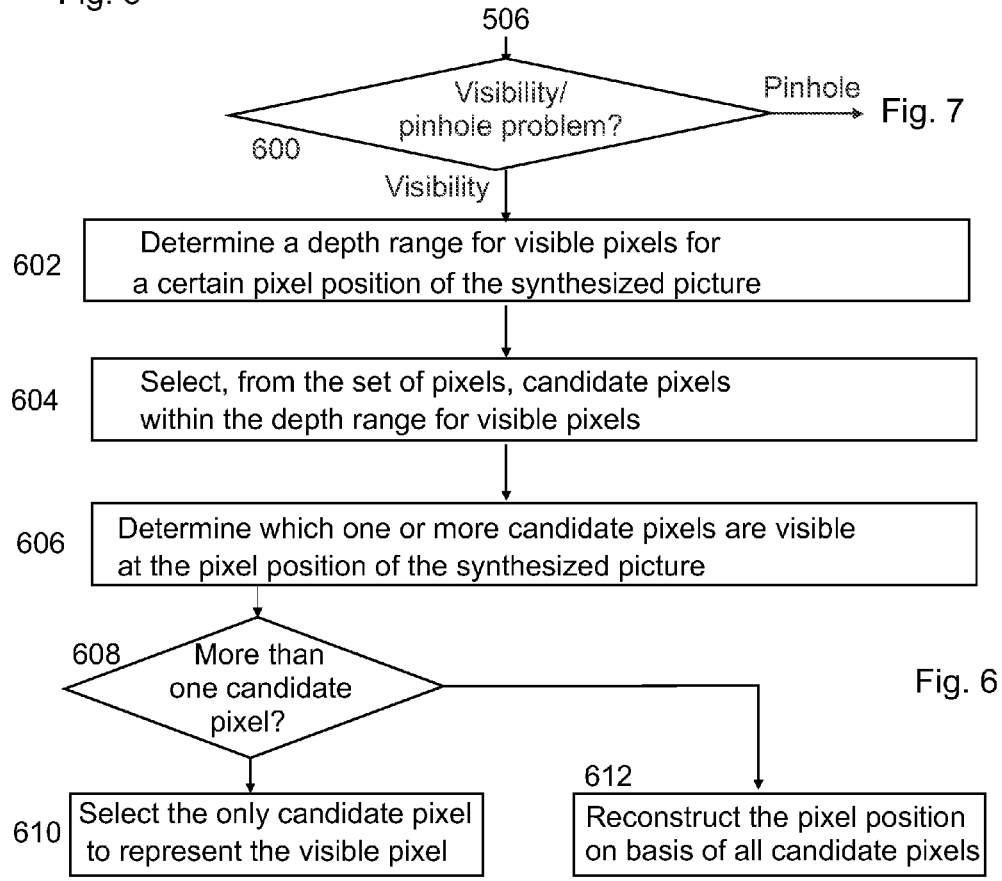
FIG. 6 shows a flow chart illustrating a further embodiment of the invention.
Figure 7:
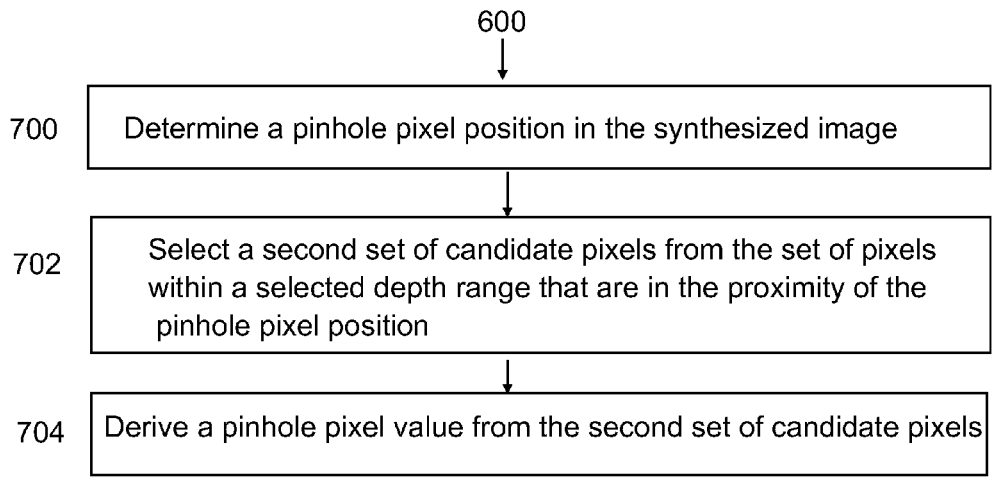
FIG. 7 shows a flow chart illustrating a further embodiment of the invention.

This embodiment is further illustrated in the flow chart of FIG. 7, which can be regarded as a particular implementation of the final step (508) of FIG. 5, and wherein the starting point is the outcome of the step (600) of FIG. 6, i.e. a pinhole problem is noticed. First, a pinhole pixel position is determined (700) in the synthesized image; and then a pixel value of the pinhole pixel position is determined based on a selected depth range. According to an embodiment, this is carried out such that a second set of candidate pixels are selected (702) from the set of pixels within the selected depth range, and a pinhole pixel value is derived (704) from the second set of candidate pixels that are in the proximity of the pinhole pixel position.

According to a further embodiment, said candidate pixels are firstly truncated, wherein the truncation process excludes the candidate pixels with associated depth values which are not in a certain depth range. The depth range is preferably selected in a way that this range is either the minimum of all the ranges that cover the candidate pixels or the range that covers maximum number of candidate pixels.

As mentioned above, the reconstruction process is only needed when there are more than one candidate pixels that need to be considered after the described solutions for both the pinhole filling and the visibility problems.

According to an embodiment, both of these visibility problems are solved by a method, wherein the depth level of the destination pixel is used for 3D interpolation/splatting, wherein the depth value averaged from the selected candidates pixels are taken into account.

One possible solution is described as follows. In the reference image, assume the warped pixel has the coordinate of pixel $[\hat{u}\,\hat{v}\,\hat{z}]^T$, wherein $\hat{z}$ can be a float value which is averaged from the depth values of the selected candidates and $[\hat{u}\,\hat{v}]^T$ are integer position in the destination image plane. Let us assume that the candidate pixels have coordinates $[x''_i\,y''_i\,z''_i]^T$. The interpolation is defined as follows for one color component U:

$$\underline{U} = \sum_{i=1\ldots C} U_i \cdot 1/d_i \Big/ \sum_{i=1\ldots C} 1/d_i,$$

wherein $\underline{U}$ is the value of this color component for the destination pixel $[\hat{u}\,\hat{v}]^T$, $U_i$ is the value of the color component for a candidate pixel, and $d_i = \sqrt{F(z''_i-\hat{z}))^2+(x''_i-\hat{u})^2+(y''_i-\hat{v})^2)}$. Herein, F( ) is a linear transform function to make the unit in the z-dimension the same as that in the x and y dimension.

Thus, according to this embodiment, in response to having more than one candidate pixel without correct visibility information, reconstructing the color values of at least one candidate pixel by considering the depth values of the original candidate pixels and the depth value of the pixel to be reconstructed.

In some embodiments, a synthesized image need not comprise the same extents as the at reference images. For example, a synthesized image may exclude areas on the left-hand side or on the right-hand side of the reference images.

A skilled man appreciates that any of the embodiments described above may be implemented as a combination with one or more of the other embodiments, unless there is explicitly or implicitly stated that certain embodiments are only alternatives to each other.

As is known for a person skilled in the art, a disparity or parallax between respective pixels in two views can be derived from depth or vice versa. Thus, the embodiments of the invention can be altered to apply to disparity in addition to or instead of depth. For a detailed description of an algorithm for converting disparity to depth or vice versa is disclosed in ISO/IEC International standard 23002-3: 2007.

Figure 8:
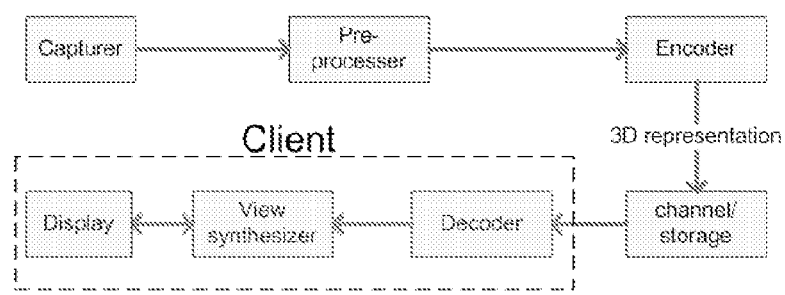
FIG. 8 shows an example of a 3D video system, wherein the embodiments of the invention may be implemented.

FIG. 8 illustrates an example of a 3D video system, wherein the above-described embodiments can be implemented. 3D video content is captured as multiple video sequences (N views) with or without depth images. The pre-processor is responsible for geometry rectification and color calibration. Furthermore, it may perform depth estimation to associate depth images to the video sequence(s).

At the encoder, the video sequences are coded into bit-streams, by e.g. an MVC encoder. If the content is with depth images, they can be coded e.g., as auxiliary pictures, supported in H.264/AVC. The compressed 3D representations, namely bitstreams, are transmitted through a specific channel or hold in a storage device.

When the client receives a bitstream from a channel or a storage device, it decodes the N views and the depth images if any. A view synthesizer can generate novel views based on this N views and the depth images using the view synthesis algorithms, especially in accordance with the above-described embodiments. The view synthesizer can also interact with the display, which e.g., provides a human interface device, like remote controller. The view synthesizer may further be integrated into the decoder, especially for autostereoscopic applications with small viewing angles.

In some embodiments, a synthesized image is used as a reference image for prediction in the encoder and the decoder. A synthesized image may comprise only a prediction block and need not be stored as a reference image. The type of prediction may but needs not be one of inter prediction, inter-view prediction, and inter-layer prediction The decoder can be implemented in a data processing device as an integral part of the device, i.e. as an embedded structure, or the decoder may be a separate module, which comprises the required view synthesizer functionalities and which is attachable to various kind of data processing devices. The required view synthesizer functionalities may be implemented as a chipset, i.e. an integrated circuit and a necessary connecting means for connecting the integrated circuit to the data processing device.

The different parts of video-based communication systems, particularly terminals, may comprise properties to enable bi-directional transfer of multimedia streams, i.e. transfer and reception of streams. This allows the encoder and decoder to be implemented as a video codec comprising the functionalities of both an encoder and a decoder.

It is to be noted that the functional elements of the invention in the above video encoder, video decoder and terminal can be implemented preferably as software, hardware or a combination of the two. The coding and decoding methods of the invention are particularly well suited to be implemented as computer software comprising computer-readable commands for carrying out the functional steps of the invention. The encoder and decoder can preferably be implemented as a software code stored on storage means and executable by a computer-like device, such as a personal computer (PC) or a mobile station (MS), for achieving the coding/decoding functionalities with said device. Other examples of electronic devices, to which such coding/decoding functionalities can be applied, are personal digital assistant devices (PDAs), set-top boxes for digital television systems, gaming consoles, media players and televisions.

Figure 9:
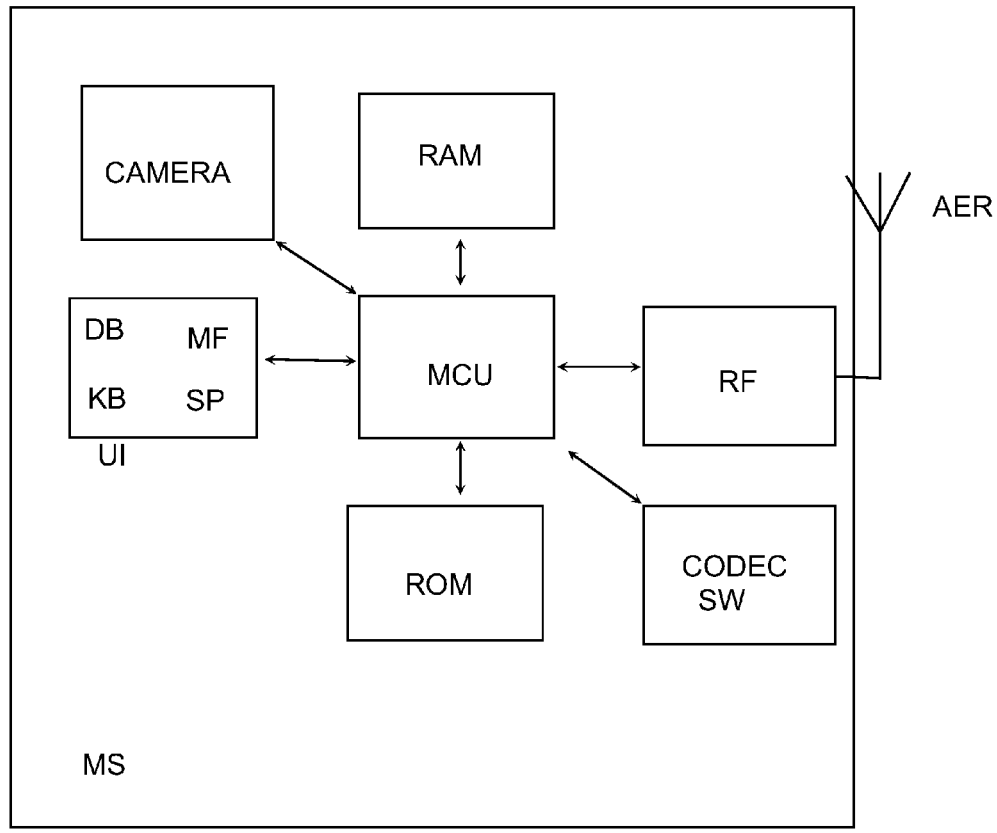
FIG. 9 shows a block diagram of a communication apparatus according to a preferred embodiment of the invention.

FIG. 9 shows a block diagram of a mobile communication device MS according to the preferred embodiment of the invention. In the mobile communication device, a Master Control Unit MCU controls blocks responsible for the mobile communication device's various functions: a Random Access Memory RAM, a Radio Frequency part RF, a Read Only Memory ROM, video codec CODEC and a User Interface UI. The user interface comprises a keyboard KB, a display DP, a speaker SP and a microphone MF. The MCU is a microprocessor, or in alternative embodiments, some other kind of processor, for example a Digital Signal Processor. Advantageously, the operating instructions of the MCU have been stored previously in the ROM memory. In accordance with its instructions (i.e. a computer program), the MCU uses the RF block for transmitting and receiving data over a radio path via an antenna AER. The video codec may be either hardware based or fully or partly software based, in which case the CODEC comprises computer programs for controlling the MCU to perform the view synthesizer functions as required. The MCU uses the RAM as its working memory. The mobile communication device can capture motion video by the video camera, encode and packetize the motion video using the MCU, the RAM and CODEC based software. The RF block is then used to exchange encoded video with other parties.

It is obvious that the present invention is not limited solely to the above-presented embodiments, but it can be modified within the scope of the appended claims.

The invention claimed is:

1. A method comprising:
receiving at least one reference image having a corresponding depth image;
synthesizing a set of pixels, each associated with a warped depth value, based on the at least one reference image and the corresponding depth image;
segmenting the warped depth values of the set of pixels into a plurality of depth ranges; and
transforming the at least one reference image into a synthesized image based on at least one depth range.

2. The method according to claim 1, the method further comprising
creating a histogram on the basis of the warped depth values of the set of pixels; and
performing said segmenting on the basis of the histogram.

3. The method according to claim 1, the method further comprising
determining a depth range for visible pixels for a pixel position of the synthesized picture;
selecting candidate pixels from the set of pixels within said depth range for visible pixels; and
determining one or more candidate pixels which are visible at said pixel position of the synthesized picture.

4. The method according to claim 3, the method further comprising
selecting the depth range such that the depth range is the minimum of all the depth ranges that cover the candidate pixels.

5. The method according to claim 3, wherein in response to having more than one candidate pixel,
reconstructing at least one reconstructed pixel on the basis of the warped depth values of the visible candidate pixels.

6. The method according to claim 1, the method further comprising
determining a pinhole pixel position in the synthesized image; and
determining a pixel value of the pinhole pixel position based on a selected depth range.

7. The method according to claim 6, the method further comprising
selecting a second set of candidate pixels from the set of pixels within the selected depth range that are in the proximity of the pinhole pixel position; and
deriving a pinhole pixel value from the second set of candidate pixels.

8. The method according to claim 7, wherein
the depth range is selected in a way that the depth range is the minimum of all the ranges that cover the second set of candidate pixels.

9. The method according to claim 7, wherein
the depth range is selected to comprise a maximum number of candidate pixels among the second set of candidate pixels.

10. The method according to claim 7, wherein in response to having more than one candidate pixel,
reconstructing at least one reconstructed pixel on the basis of the warped depth values of the second set of candidate pixels.

11. An apparatus comprising:
a view synthesizer unit for creating a synthesized image; the view synthesizer unit being arranged to
receive at least one reference image having a corresponding depth image;
synthesize a set of pixels, each associated with a warped depth value, based on the at least one reference image and the corresponding depth image;
segment the warped depth values of the set of pixels into a plurality of depth ranges; and
transform the at least one reference image into a synthesized image based on at least one depth range.

12. The apparatus according to claim 11, wherein the view synthesizer unit is further arranged to
create a histogram on the basis of the warped depth values of the set of pixels; and
perform said segmenting on the basis of the histogram.

13. The apparatus according to claim 11, wherein the view synthesizer unit is further arranged to
determine a depth range for visible pixels for a pixel position of the synthesized picture;
select candidate pixels from the set of pixels within said depth range for visible pixels; and
determine one or more candidate pixels which are visible at said pixel position of the synthesized picture.

14. The apparatus according to claim 13, wherein the view synthesizer unit is further arranged to
select the depth range such that the depth range is the minimum of all the depth ranges that cover the candidate pixels.

15. The apparatus according to claim 13, wherein in response to having more than one candidate pixel, the view synthesizer unit is further arranged to
reconstruct at least one reconstructed pixel on the basis of the warped depth values of the visible candidate pixels.

16. The apparatus according to claim 11, wherein the view synthesizer unit is further arranged to
determine a pinhole pixel position in the synthesized image; and
determine a pixel value of the pinhole pixel position based on a selected depth range.

17. The apparatus according to claim 16, wherein the view synthesizer unit is further arranged to
select a second set of candidate pixels from the set of pixels within the selected depth range that are in the proximity of the pinhole pixel position; and
derive a pinhole pixel value from the second set of candidate pixels.

18. The apparatus according to claim 17, wherein the view synthesizer unit is further arranged to
select the depth range such that the depth range is the minimum of all the ranges that cover the second set of candidate pixels.

19. The apparatus according to claim 17, wherein the view synthesizer unit is further arranged to
select the depth range to comprise a maximum number of candidate pixels among the second set of candidate pixels.

20. The apparatus according to claim 17, wherein in response to having more than one candidate pixel, the view synthesizer unit is further arranged to
reconstruct at least one reconstructed pixel on the basis of the warped depth values of the second set of candidate pixels.

21. A decoder comprising:
a receiving unit for receiving and decoding at least one encoded reference image having a corresponding depth image;
a view synthesizer unit for creating a synthesized image; the view synthesizer unit being arranged to
synthesize a set of pixels, each associated with a warped depth value, based on the at least one reference image and the corresponding depth image;
segment the warped depth values of the set of pixels into a plurality of depth ranges; and
transform the at least one reference image into a synthesized image based on at least one depth range.

22. A computer readable medium comprising a computer program stored therein, said computer program being executable in a data processing device, the computer program comprising:
a computer program code section for receiving at least one reference image having a corresponding depth image;
a computer program code section for synthesizing a set of pixels, each associated with a warped depth value, based on the at least one reference image and the corresponding depth image;
a computer program code section for segmenting the warped depth values of the set of pixels into a plurality of depth ranges; and
a computer program code section for transforming the at least one reference image into a synthesized image based on at least one depth range.

23. A chipset comprising:
a view synthesizer functionality for creating a synthesized image; the view synthesizer functionality being arranged to
receive at least one reference image having a corresponding depth image;
synthesize a set of pixels, each associated with a warped depth value, based on the at least one reference image and the corresponding depth image;
segment the warped depth values of the set of pixels into a plurality of depth ranges; and
transform the at least one reference image into a synthesized image based on at least one depth range.

* * * * *